United States Patent [19]
Prinzhorn et al.

[11] 3,813,765
[45] June 4, 1974

[54] METHOD OF MANUFACTURING TUBULAR ELECTROMAGNETIC WAVE GUIDES

[75] Inventors: Klaus Prinzhorn, Burgdorf; Dieter Hein, Hannover, both of Germany

[73] Assignee: Kabel-und Metallwerk Gutehoffnungshuette A.G., Hanover, Germany

[22] Filed: May 12, 1972

[21] Appl. No.: 252,833

[30] Foreign Application Priority Data
May 21, 1971 Germany............................ 2125189

[52] U.S. Cl. ................................. 29/600, 333/95 R
[51] Int. Cl. ............................................ H01p 11/00
[58] Field of Search ................ 72/367, 368; 29/600; 333/95; 343/772

[56] References Cited
UNITED STATES PATENTS
| | | | |
|---|---|---|---|
| 2,930,007 | 3/1960 | Anderson et al. ................ | 29/600 |
| 3,195,079 | 7/1965 | Burton et al. .................... | 29/600 |
| 3,546,916 | 12/1970 | Tsutomu Maeda et al. ........ | 72/256 |

FOREIGN PATENTS OR APPLICATIONS
| | | | |
|---|---|---|---|
| 855,919 | 11/1970 | Canada............................ | 29/600 |

*Primary Examiner*—Lowell A. Larson
*Attorney, Agent, or Firm*—Marn & Jangarathis

[57] ABSTRACT

In the manufacture of a tubular electromagnetic wave guide having a non-circular internal cross section, wherein a conductive tape is initially formed into a tubular wave guide having preferably a circular internal cross section, and a welded longitudinal seam varying in thickness that presents an uneven surface in the interior of the wave guide to cause wave reflection to impair wave transmission, the process which comprises: changing the initial internal cross sectional configuration of the wave guide into a non-circular cross sectional configuration in such a manner as to position the uneven surface of the welded longitudinal seam at a location in the interior of said wave guide whereat the electrical field intensity of the electromagnetic wave to be transmitted by such wave guide would be at an approximate minimum value, thus causing a corresponding minimum wave reflection for improving the wave transmission characteristics of the wave guide.

4 Claims, 3 Drawing Figures

METHOD OF MANUFACTURING TUBULAR ELECTROMAGNETIC WAVE GUIDES

The invention concerns a process for the manufacture of an improved tubular electromagnetic wave conductor having a non-circular internal cross section. The tubular conductor is formed from a longitudinally driven metal band(s) that is shaped into a first tubular configuration having, for example, a circular internal cross section; welding the abutting longitudinal edges of such band configuration; and deforming such first tubular configuration with particular reference to the longitudinal seam formed by said welded edges, so as to provide a non-circular internal cross section having a particular orientation with respect to said seam.

Generally, in the manufacture of a tubular electromagnetic wave conductor from a metallic band, the conductor in its initial tubular configuration, for example, having a circular internal cross section, is guided through a welding device by use of caterpillar traction or plier traction and after welding is wound on a drum. Although traction devices of this type are adjustable as to speed, and despite the fact that the magnitude of the current is also controlled, the movement of such conductor is still not completely constant. The consequence is that the conductor is formed with a welding bead in the longitudinal seam of varying thicknesses whose dimensions fluctuate systematically, especially if the traction device has systematic flaws in its synchronization. These fluctuations in the thickness of the bead in the longitudinal seam show up in the transmission of electromagnetic waves in the form of reflections whose values become particularly noticeable in a negative way if the partial reflections of like phase are additive.

The invention was prompted by the task of developing a process for the manufacture of a tubular electromagnetic wave conductor which avoids the above-noted deleterious effects caused by material thickness fluctuations in the welded longitudinal seam. This task is solved by a process of the type described above in as much as the tubular electromagnetic wave conductor is deformed from its initial configuration so as to acquire a non-circular interior cross section so orientated with respect to the welded longitudinal seam, that the seam is positioned in an area of low, preferably of the lowest, electrical field intensity of the electromagnetic wave mode to be transmitted by such conductor. The advantage of the invention lies in the shifting of the longitudinal welded seam away from the area that has so far been the customary one where generally the electrical field intensity of the transmitted wave mode is at its maximum, and placing it in an area of low electrical field intensity where the reflections are consequently also considerably reduced.

The process according to the invention is explained in the drawing in which.

Figure 1:
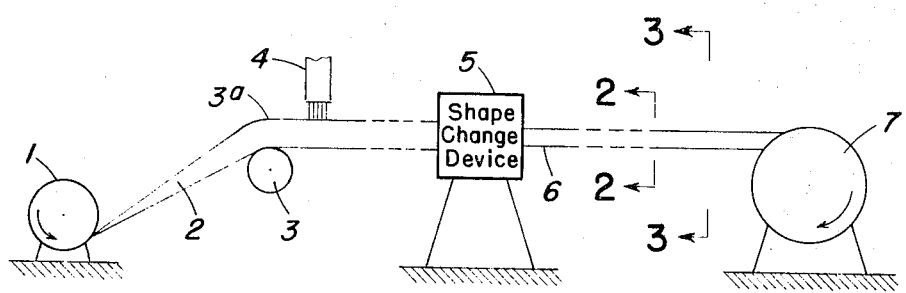
FIG. 1 shows equipment appropriate to execute the process of the invention.

Turning now to FIG. 1, from a drum 1, a metal band 2, for example of copper or aluminum, is wound thereoff, via a priorly known reel and shaping mechanism 3, and shaped into a tubular conductor 3a having preferably a circular cross section. As the longitudinal edges of band 2 meet, they are welded to each other in a welding device 4. In accordance with this invention the welded tubular conductor is guided into a shape change device 5 wherein the cross section of the conductor is changed in accordance with a particular orientation to the welded seam. Subsequently, a finished tubular conductor 6 may be wound on a drum 7.

Figure 2:
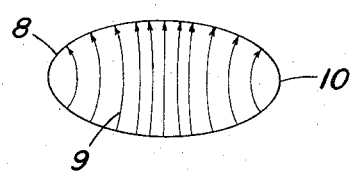
FIGS. 2 and 3 show sectional views of tubular conductors formed with differently shaped internal non-circular cross sections having appropriate orientations with respect to their welded longitudinal seams.

The tubular conductor 6 can according to FIG. 2 have the shape of an elliptical tube 8. If a magnetic wave $H_{c11}$, whose direction of polarization runs as shown by arrows 9 were to be transmitted, then the tubular conductor 3a is deformed in shape change device 5 in such a manner that a seam 10 is positioned at the level of the large or maximum axis of the ellipse. In this area of the welded seam in the tubular conductor, the lowest value of electrical field intensity for the type of wave mentioned above occurs, so that the seam does not cause any significant interference in this location.

If other waves are to be transmitted, for example the $M_{s11}$ wave, whose direction of polarization runs at a right angle to that of the $H_{c11}$ wave, the seam 10 will of course be shifted by 90°. The tubular conductor according to FIG. 2 can be designed as a smooth tube, but it is also possible to corrugate the tubular conductor after welding in order to increase its flexibility.

Figure 3:
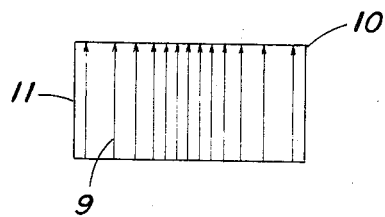

FIG. 3 shows a tubular conductor 11 formed in the foregoing manner with an oblong internal cross section, where the seam 10 extends at the area of the lowest electrical field intensity of the transmitted wave.

It is noted that though the instant process has been described with particular regard to deforming the initially formed tubular conductor from one having a circular internal cross section, to that having a non-circular cross section with a particular orientation with respect to the welded longitudinal seam, alternative initial cross sectional configurations are also contemplated by the present invention. Such alternative configurations are dependent not only upon the ultimate internal cross sectional configuration to be achieved, but also the feasibility of the realization of continuous high quality longitudinal seam welding.

We claim:

1. In a process for producing an elliptical wave guide for the transmission of $H_{c11}$ waves which includes the steps of forming a strip of metallic material into a tubular configuration having an initial internal cross section and welding adjacent edges of the metallic strip formed into said tubular configuration to form a welded longitudinal seam varying in wall thickness which thereby presents an uneven surface portion in the interior of the formed wave guide, the improvement comprising:
   deforming the tubular wave guide to alter said initial internal cross section into an elliptical cross section with the uneven surface portion at a position in the interior of the wave guide proximate to the intersection of an axis of maximum dimension of the elliptical cross section with the interior of the wave guide.

2. The process of claim 1 wherein the process is effected continuously.

3. The improved process for the manufacture of a tubular wave guide according to claim 1 wherein said initial internal cross section is circular.

4. The improved process for the manufacture of a tubular wave guide according to claim 1 wherein said tubular configuration is formed in a manner so that the edges of said metallic strip are butt-jointed and said butt-jointed edges are welded to form said longitudinal seam.

* * * * *